United States Patent
Liu et al.

(10) Patent No.: US 12,114,317 B2
(45) Date of Patent: Oct. 8, 2024

(54) SIDELINK CHANNEL STATE INFORMATION (CSI) REPORTING FROM A USER EQUIPMENT

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US); Shuanshuan Wu, San Diego, CA (US); Rajat Prakash, San Diego, CA (US); Sony Akkarakaran, Poway, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 17/158,463

(22) Filed: Jan. 26, 2021

(65) Prior Publication Data

US 2022/0240291 A1    Jul. 28, 2022

(51) Int. Cl.
*H04W 72/23*      (2023.01)
*H04B 7/06*       (2006.01)

(52) U.S. Cl.
CPC .......... *H04W 72/23* (2023.01); *H04B 7/0626* (2013.01)

(58) Field of Classification Search
None
See application file for complete search history.

(56) References Cited

U.S. PATENT DOCUMENTS

| | | | |
|---|---|---|---|
| 10,631,317 B2* | 4/2020 | Xu | ......................... H04L 43/00 |
| 10,893,557 B2* | 1/2021 | Gulati | ............... H04B 7/15542 |
| 11,576,200 B2* | 2/2023 | Kim | ...................... H04W 72/23 |
| 2008/0056174 A1* | 3/2008 | Jung | .................. H04B 7/15542 |
| | | | 370/315 |
| 2008/0108369 A1* | 5/2008 | Visotsky | .............. H04B 7/2606 |
| | | | 455/455 |
| 2009/0175214 A1* | 7/2009 | Sfar | ..................... H04J 11/0053 |
| | | | 370/315 |
| 2012/0184204 A1* | 7/2012 | Kazmi | ............... H04B 7/15542 |
| | | | 455/7 |

(Continued)

FOREIGN PATENT DOCUMENTS

WO    WO-2020055184 A1    3/2020

OTHER PUBLICATIONS

International Search Report and Written Opinion—PCT/US2022/070311—ISA/EPO—Apr. 20, 2022.

(Continued)

*Primary Examiner* — Gregory B Sefcheck
(74) *Attorney, Agent, or Firm* — Harrity & Harrity, LLP

(57) ABSTRACT

Various aspects of the present disclosure generally relate to wireless communication. In some aspects, a transmit (Tx) user equipment (UE) may receive, from a base station, downlink control information (DCI) that triggers sidelink channel state information (CSI) reporting from a receive (Rx) UE to the Tx UE. The Tx UE may transmit, to the Rx UE, a request for CSI based at least in part on the DCI received from the base station. The Tx UE may receive, from the Rx UE, a CSI report based at least in part on the request. The Tx UE may transmit, to the base station, the CSI report received from the Rx UE. Numerous other aspects are described.

30 Claims, 10 Drawing Sheets

(56) References Cited

U.S. PATENT DOCUMENTS

| | | | | |
|---|---|---|---|---|
| 2012/0207079 A1* | 8/2012 | Wang | H04W 28/0284 | |
| | | | 370/315 | |
| 2013/0286933 A1* | 10/2013 | Lee | H04L 1/0026 | |
| | | | 370/329 | |
| 2017/0093541 A1* | 3/2017 | Pan | H04W 72/23 | |
| 2017/0118671 A1* | 4/2017 | Lee | H04W 72/14 | |
| 2017/0353819 A1* | 12/2017 | Yin | H04W 4/70 | |
| 2018/0139724 A1* | 5/2018 | Loehr | H04W 72/02 | |
| 2018/0146494 A1* | 5/2018 | Khoryaev | H04W 76/23 | |
| 2018/0206176 A1* | 7/2018 | Panteleev | H04W 28/04 | |
| 2018/0235027 A1* | 8/2018 | Adachi | H04W 76/14 | |
| 2019/0029006 A1* | 1/2019 | Wang | H04L 1/0061 | |
| 2019/0380128 A1* | 12/2019 | Park | H04W 48/20 | |
| 2020/0021336 A1* | 1/2020 | Da Silva | H04B 7/0408 | |
| 2020/0022089 A1* | 1/2020 | Guo | H04W 52/242 | |
| 2020/0029340 A1* | 1/2020 | He | H04B 7/2615 | |
| 2020/0053768 A1* | 2/2020 | Chen | H04W 88/04 | |
| 2020/0092685 A1* | 3/2020 | Fehrenbach | H04W 4/44 | |
| 2020/0229195 A1* | 7/2020 | Lien | H04W 72/20 | |
| 2020/0313743 A1* | 10/2020 | Park | H04L 5/0057 | |
| 2020/0396760 A1* | 12/2020 | Yi | H04L 1/1864 | |
| 2020/0404571 A1* | 12/2020 | Lin | H04W 8/005 | |
| 2021/0028842 A1* | 1/2021 | Kim | H04B 7/0628 | |
| 2021/0045074 A1* | 2/2021 | Manolakos | H04L 5/0057 | |
| 2021/0050888 A1* | 2/2021 | Manolakos | H04L 5/0023 | |
| 2021/0058907 A1* | 2/2021 | Fakoorian | H04W 72/21 | |
| 2021/0099901 A1* | 4/2021 | Huang | H04L 1/1812 | |
| 2021/0105055 A1* | 4/2021 | Chae | H04L 5/0091 | |
| 2021/0135928 A1* | 5/2021 | Yi | H04W 72/1284 | |
| 2021/0143882 A1* | 5/2021 | Sarkis | H04L 1/1822 | |
| 2021/0144750 A1* | 5/2021 | Cao | H04W 72/14 | |
| 2021/0185715 A1* | 6/2021 | Shen | H04L 5/0023 | |
| 2021/0212099 A1* | 7/2021 | Yi | H04W 72/042 | |
| 2021/0250131 A1* | 8/2021 | Fan | H04L 1/1822 | |
| 2021/0258980 A1* | 8/2021 | Luo | H04W 76/14 | |
| 2021/0274545 A1* | 9/2021 | Adjakple | H04W 28/0268 | |
| 2021/0289419 A1* | 9/2021 | Hosseini | H04L 1/0007 | |
| 2021/0289529 A1* | 9/2021 | Hosseini | H04L 1/0026 | |
| 2021/0298034 A1* | 9/2021 | He | H04W 72/12 | |
| 2021/0306043 A1* | 9/2021 | Damnjanovic | H04L 1/0005 | |
| 2021/0328643 A1* | 10/2021 | Damnjanovic | H04W 24/10 | |
| 2021/0360520 A1* | 11/2021 | Chen | H04L 1/1822 | |
| 2021/0368489 A1* | 11/2021 | Sarkis | H04W 24/08 | |
| 2021/0377989 A1* | 12/2021 | Chae | H04W 56/003 | |
| 2021/0385842 A1* | 12/2021 | Zhao | H04L 5/0057 | |
| 2021/0385853 A1* | 12/2021 | Wang | H04L 5/0055 | |
| 2021/0391907 A1* | 12/2021 | Wang | H04L 1/0029 | |
| 2021/0400704 A1* | 12/2021 | Xue | H04L 1/0061 | |
| 2021/0400713 A1* | 12/2021 | He | H04L 1/08 | |
| 2022/0006576 A1* | 1/2022 | Fong | H04W 72/23 | |
| 2022/0007403 A1* | 1/2022 | Li | H04W 4/40 | |
| 2022/0046660 A1* | 2/2022 | Huang | H04W 76/14 | |
| 2022/0053513 A1 | 2/2022 | Ryu et al. | | |
| 2022/0078728 A1* | 3/2022 | Yi | H04W 72/1263 | |
| 2022/0095366 A1* | 3/2022 | Lee | H04W 72/1289 | |
| 2022/0103300 A1* | 3/2022 | Sun | H04L 5/0064 | |
| 2022/0104183 A1* | 3/2022 | Huang | H04W 72/042 | |
| 2022/0104209 A1* | 3/2022 | Lee | H04W 72/085 | |
| 2022/0104248 A1* | 3/2022 | Elshafie | H04W 72/542 | |
| 2022/0116094 A1* | 4/2022 | Wang | H04L 5/001 | |
| 2022/0150943 A1* | 5/2022 | Wu | H04W 72/20 | |
| 2022/0182120 A1* | 6/2022 | Sergeev | H04B 7/0639 | |
| 2022/0225375 A1* | 7/2022 | Wang | H04W 72/21 | |
| 2022/0240278 A1* | 7/2022 | Dutta | H04W 72/1263 | |
| 2022/0255680 A1* | 8/2022 | Moon | H04W 72/1284 | |
| 2022/0286184 A1* | 9/2022 | Li | H04B 7/0695 | |
| 2022/0311587 A1* | 9/2022 | Cheng | H04L 5/0091 | |
| 2023/0050238 A1* | 2/2023 | Ganesan | H04W 76/14 | |
| 2023/0117472 A1* | 4/2023 | Ko | H04L 5/0094 | |
| | | | 370/329 | |
| 2023/0180267 A1* | 6/2023 | Chae | H04L 5/0048 | |
| | | | 370/328 | |
| 2023/0269611 A1* | 8/2023 | Ren | H04B 17/345 | |
| | | | 370/252 | |

OTHER PUBLICATIONS

LG Electronics Inc: "Discussion on Measurement and Report in NR SL", 3GPP Draft, 3GPP TSG RAN WG2 Meeting #108, R2-1915517, 3rd Generation Partnership Project (3GPP), Mobile Competence Centre, 650, Route Des Lucioles, F-06921, Sophia-Anti Polis Cedex, France, vol. RAN WG2, No. Reno, USA, Nov. 18, 2019-Nov. 22, 2019, Nov. 8, 2019 (Nov. 8, 2019), XP051817259, pp. 1-6, Retrieved from the Internet: URL: https://ftp.3gpp.org/tsg_ran/WG2_RL2/TSGR2_108/Docs/R2-1915517.zip, R2-1915517 Discussion on measurement and report in NRSL.doc, [retrieved on Nov. 8, 2019], the whole document, Sections 2 and 3.

NTT DOCOMO, Inc: "NR Sidelink Resource Allocation Mechanism Mode 1", 3GPP Draft, 3GPP TSG RAN WG1 #96bis, R1-1905422, Mode 1_Final, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 3, 2019 (Apr. 3, 2019), XP051707492, 5 Pages, Retrieved from the Internet: URL: http://www.3gpp.org/ftp/tsg_ran/WG1_RL1/TSGR1_96b/Docs/R1-1905422.zip, [retrieved on Apr. 3, 2019] Section 2.4, figure 1.

* cited by examiner

SIDELINK CHANNEL STATE INFORMATION (CSI) REPORTING FROM A USER EQUIPMENT

FIELD OF THE DISCLOSURE

Aspects of the present disclosure generally relate to wireless communication and to techniques and apparatuses for channel state information (CSI) reporting for sidelink user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of UEs. A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a transmit (Tx) UE includes receiving, from a base station, downlink control information (DCI) that triggers sidelink CSI reporting from a receive (Rx) UE to the Tx UE; transmitting, to the Rx UE, a request for CSI based at least in part on the DCI received from the base station; receiving, from the Rx UE, a CSI report based at least in part on the request; and transmitting, to the base station, the CSI report received from the Rx UE.

In some aspects, a method of wireless communication performed by an Rx UE includes receiving a grant for sidelink CSI reporting; receiving, from a Tx UE, a request for CSI; and transmitting, to the Tx UE or a base station, a CSI report based at least in part on the grant and the request.

In some aspects, a Tx UE for wireless communication includes a memory and one or more processors operatively coupled to the memory, the one or more processors configured to: receive, from a base station, DCI that triggers sidelink CSI reporting from an Rx UE to the Tx UE; transmit, to the Rx UE, a request for CSI based at least in part on the DCI received from the base station; receive, from the Rx UE, a CSI report based at least in part on the request; and transmit, to the base station, the CSI report received from the Rx UE.

In some aspects, an Rx UE for wireless communication includes a memory and one or more processors operatively coupled to the memory, the one or more processors configured to: receive a grant for sidelink CSI reporting; receive, from a Tx UE, a request for CSI; and transmit, to the Tx UE or a base station, a CSI report based at least in part on the grant and the request.

In some aspects, a non-transitory computer-readable medium storing a set of instructions for wireless communication includes one or more instructions that, when executed by one or more processors of a Tx UE, cause the Tx UE to: receive, from a base station, DCI that triggers sidelink CSI reporting from an Rx UE to the Tx UE; transmit, to the Rx UE, a request for CSI based at least in part on the DCI received from the base station; receive, from the Rx UE, a CSI report based at least in part on the request; and transmit, to the base station, the CSI report received from the Rx UE.

In some aspects, a non-transitory computer-readable medium storing a set of instructions for wireless communication includes one or more instructions that, when executed by one or more processors of an Rx UE, cause the Rx UE to: receive a grant for sidelink CSI reporting; receive, from a Tx UE, a request for CSI; and transmit, to the Tx UE or a base station, a CSI report based at least in part on the grant and the request.

In some aspects, a Tx apparatus for wireless communication includes means for receiving, from a base station, DCI that triggers sidelink CSI reporting from an Rx apparatus to the Tx apparatus; means for transmitting, to the Rx apparatus, a request for CSI based at least in part on the DCI received from the base station; means for receiving, from the Rx apparatus, a CSI report based at least in part on the request for CSI; and means for transmitting, to the base station, the CSI report received from the Rx apparatus.

In some aspects, an Rx apparatus for wireless communication includes means for receiving a grant for sidelink CSI reporting; means for receiving, from a Tx apparatus, a request for CSI; and means for transmitting, to the Tx apparatus or a base station, a CSI report based at least in part on the grant and the request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
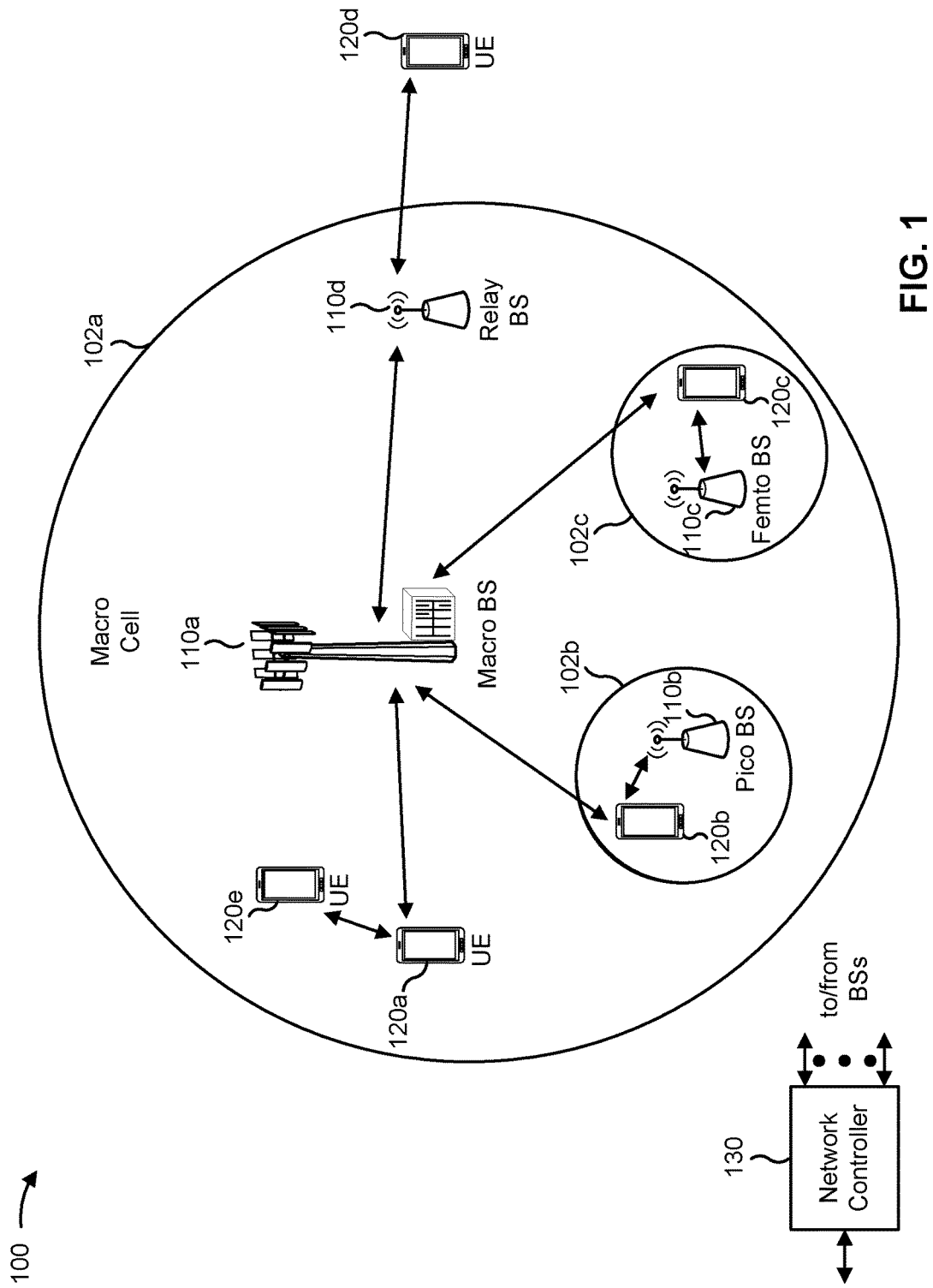
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
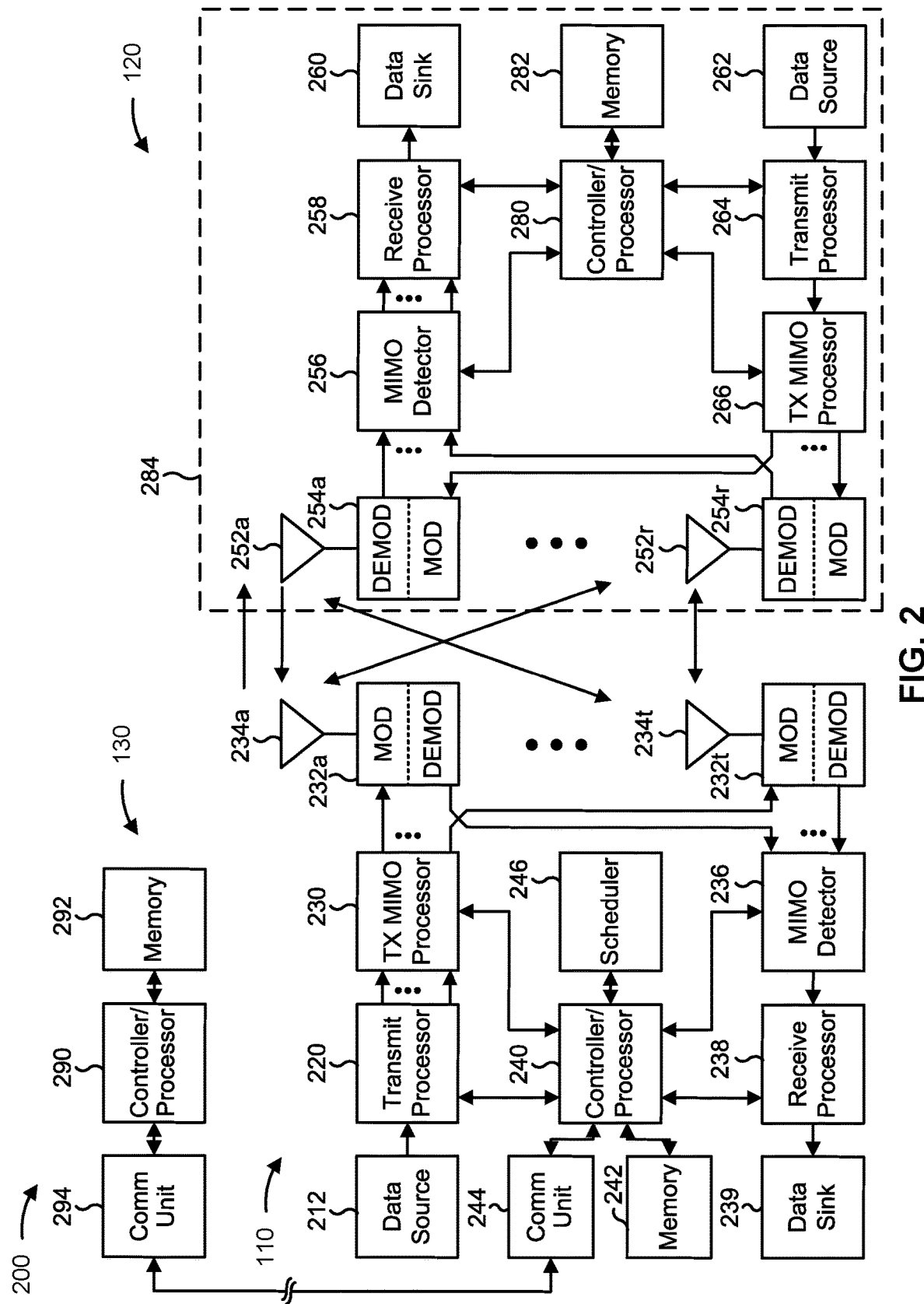
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with CSI reporting for sidelink UEs, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the Tx UE includes means for receiving, from a base station, DCI that triggers sidelink CSI reporting from an Rx UE to the Tx UE; means for transmitting, to the Rx UE, a request for CSI based at least in part on the DCI received from the base station; means for receiving, from the Rx UE, a CSI report based at least in part on the request; and/or means for transmitting, to the base station, the CSI report received from the Rx UE. In some aspects, the means for the Tx UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the Tx UE includes means for adding an Rx UE identifier associated with the Rx UE to the CSI report transmitted to the base station.

In some aspects, the Tx UE includes means for transmitting, to the Rx UE, an indication of a Tx UE identifier associated with the Tx UE.

In some aspects, the Rx UE includes means for receiving a grant for sidelink CSI reporting; means for receiving, from a Tx UE, a request for CSI; and/or means for transmitting, to the Tx UE or a base station, a CSI report based at least in part on the grant and the request. The means for the Rx UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the Rx UE includes means for receiving a sidelink grant in downlink control information (DCI) from the base station; and/or means for transmitting the CSI report to the Tx UE based at least in part on the sidelink grant.

In some aspects, the Rx UE includes means for receiving a sidelink grant in sidelink control information from the Tx UE; and/or means for transmitting the CSI report to the Tx UE based at least in part on the sidelink grant.

In some aspects, the Rx UE includes means for receiving, from the base station, DCI that includes an indication to transmit the CSI report to one or more of the Tx UE or the base station.

In some aspects, the Rx UE includes means for receiving, from the Tx UE, sidelink control information that includes an indication to transmit the CSI report to one or more of the Tx UE or the base station.

In some aspects, the Rx UE includes means for receiving, from the Tx UE, radio resource control signaling that includes an indication to transmit the CSI report to one or more of the Tx UE or the base station.

In some aspects, the Rx UE includes means for receiving an uplink grant in DCI from the base station; and/or means for transmitting the CSI report to the base station based at least in part on the uplink grant.

In some aspects, the Rx UE includes means for receiving an uplink grant in sidelink control information from the Tx UE; and/or means for transmitting the CSI report to the base station based at least in part on the uplink grant.

In some aspects, the Rx UE includes means for adding a Tx UE identifier associated with the Tx UE to the CSI report that is transmitted to the base station.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

3GPP Release 16 sidelink communications focus on light loaded traffic. In Release 16 sidelink mode 1, a base station may select a lowest starting subchannel and a number of subchannels for an initial transmission, and time/frequency resources for up to two retransmissions. A sidelink UE may adapt an MCS based on a medium access control control element (MAC-CE)-based aperiodic CSI report, which may include a rank indication (RI) comprising one bit and a channel quality indicator (CQI) comprising of four bits.

3GPP New Radio Unlicensed (NR-U) sidelink communications focus on bursty traffic, in which CSI may be a key factor for throughput. For NR-U sidelink communications, the base station may transmit an indication of a destination index in DCI for dynamic scheduling, which may be reported in a buffer status report (BSR) or in radio resource control (RRC) messages. The dynamic scheduling may provide a dynamic grant or a configured grant type 1/type 2. The indication of the destination index may allow for improved control of resource management by the base station, and may be suitable for Enhanced Mobile Broadband (eMBB) traffic. Further, the indication of the destination index may allow the base station to control which Rx UE receives a sidelink packet, even when the sidelink packet originates at a Tx UE.

For NR-U sidelink, subchannels may be across a 100 MHz bandwidth part (BWP), and the 100 MHz BWP may be divided into five 20 MHz listen-before-talk (LBT) subchannels. Each individual LBT subchannel may have a different interference level due to WiFi channelization, and a frequency diversity over such a wideband may be substantial.

In Release 16 sidelink mode 1, the base station may not have CSI to make informed scheduling decisions, where the CSI may include an RI and a CQI. A time/frequency resource allocation may be indicated by the base station to a Tx UE, but the base station may be unable to determine which subchannel is favorable from an Rx UE perspective. On a per subchannel level, without the CSI, the base station may not maximize spectral efficiency. Rather, the base station may only make a conservative estimate of frequency resources needed for a transport block.

For Release 16 sidelink communications, Rx UEs may be transparent to the base station. The base station may transmit DCI (e.g., DCI 3_0) associated with a per node control and not a per link control. The base station may transmit the DCI to schedule time/frequency resources for a sidelink transmission of a Tx UE, and may not have information on the Rx UE that receives the sidelink transmission from the Tx UE. The base station may only have information on a set of Rx UEs that may receive the sidelink transmission from the Tx UE, based at least in part on a sidelink BSR. However, in newer designs for sidelink communications, the base station may transmit DCI associated with a per link control, based at least in part by including a destination identifier (ID) in the DCI (e.g., DCI 3_0). The per link control may serve to avoid half duplex deafness and improve an efficiency of time/frequency resource allocation. Further, with the per link control, MAC-CE CSI reports from Rx UEs to Tx UEs may be improved.

In 3GPP Release 16 sidelink mode 1, the base station may not receive CSI associated with an Rx UE to make informed scheduling decisions for the Rx UE. As a result, the base station may be unable to determine which subchannel is favorable from an Rx UE perspective. On a per subchannel level, without the CSI, the base station may not maximize spectral efficiency, and may make a conservative estimate of frequency resources needed for a transport block.

In various aspects of techniques and apparatuses described herein, a Tx UE may receive, from a base station, DCI that triggers sidelink CSI reporting from an Rx UE to the Tx UE. The Tx UE may transmit, to the Rx UE, a request for CSI based at least in part on the DCI received from the base station. The request may be associated with a channel state information reference signal (CSI-RS). The Tx UE may receive, from the Rx UE, a CSI report such as a MAC-CE CSI report based at least in part on the CSI-RS. The Tx UE may transmit, to the base station, the MAC-CE CSI report received from the Rx UE. Further, the Rx UE may receive a grant for sidelink CSI reporting, and the Rx UE may transmit the MAC-CE CSI report based at least in part on the grant and the CSI-RS received from the Tx UE. As a result, the base station may determine CSI associated with the Rx UE based at least in part on the MAC-CE CSI report, and the base station may perform scheduling for the Rx UE based at least in part on the MAC-CE CSI report.

Figure 3:
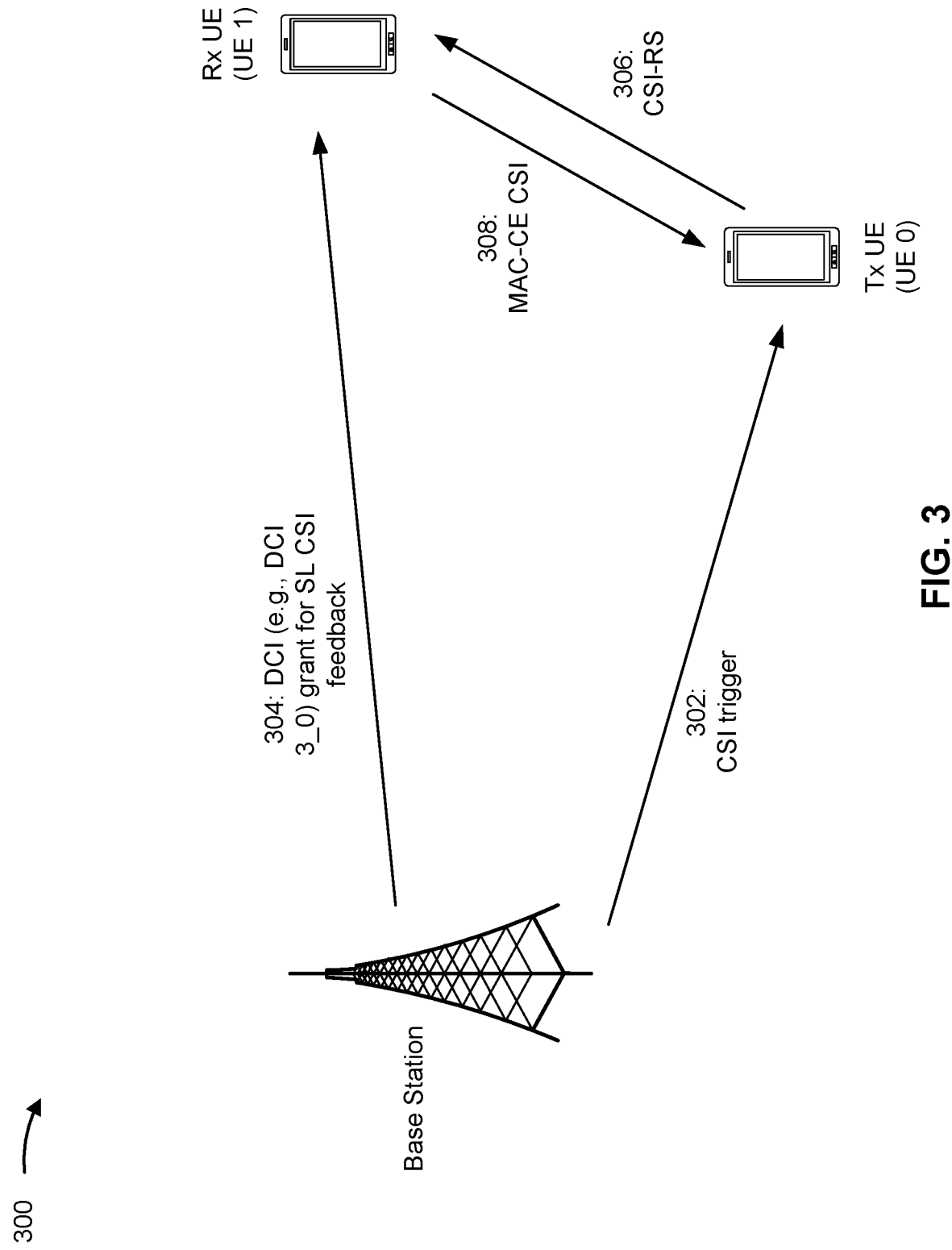
FIGS. 3-6 are diagrams illustrating examples associated with CSI reporting for sidelink UEs, in accordance with the present disclosure.

FIG. 3 is a diagram illustrating an example 300 associated with CSI reporting for sidelink UEs, in accordance with the present disclosure. As shown in FIG. 3, example 300 includes communication between a base station (e.g., base station 110), a Tx UE (e.g., UE 120a) and an Rx UE (e.g., UE 120e). In some aspects, the Tx UE (UE 0), the Rx UE (UE 1), and the base station may be included in a wireless network such as wireless network 100. The Tx UE and the Rx UE may communicate on a wireless sidelink.

As shown by reference number 302, the base station may transmit DCI (e.g., DCI 3_0), to the Tx UE, that triggers sidelink CSI reporting from the Rx UE to the Tx UE. In other words, a sidelink CSI feedback trigger may be controlled by the base station via the DCI. The DCI may indicate a destination ID (e.g., UE 0). Since the base station may control the destination ID, the base station may have greater control over time/frequency resources used to transmit a channel state information reference signal (CSI-RS) from the Tx UE to the Rx UE. Further, the base station may have greater control over which slot/subchannel is used by the Rx UE to report CSI to the Tx UE, and an overall improved control on a CSI reporting timeline.

In Release 16 sidelink communications, an in-coverage Rx UE may request a DCI grant for sending a MAC-CE CSI report to a Tx UE. The in-coverage Rx UE may request the DCI grant based at least in part on a uU scheduling request (SR) procedure and a BSR. On the other hand, with a base station-controlled destination ID and CSI trigger, the base station may improve a CSI feedback delay, as compared to a CSI feedback timing in Release 16 sidelink communications.

In some aspects, the base station may provision a sidelink grant for sidelink CSI feedback. The sidelink CSI feedback may be a MAC-CE CSI report, which may be based at least in part on a CSI timeline. The base station may have information on the CSI triggering, on which Rx UE (e.g., UE 1) is to transmit the MAC-CE CSI report, and/or on which Rx UE is to receive packets (e.g., a CSI-RS) from the Tx UE.

As shown by reference number 304, the base station may transmit a DCI (e.g., DCI 3_0) grant, to the Rx UE, for sidelink CSI feedback. The DCI may be transmitted to the Rx UE to enable sidelink CSI feedback from the Rx UE, which may be the MAC-CE CSI report. Based at least in part on a time associated with the DCI triggering and the CSI reporting timeline, the base station may determine when to transmit the DCI grant to the Rx UE, to enable the Rx UE to transmit the MAC-CE CSI report to the Tx UE.

In some aspects, the destination ID (e.g., UE 0) in the sidelink CSI feedback trigger, as indicated by the DCI transmitted from the base station to the Tx UE, may indicate which CSI report(s) to select at the Rx UE (e.g., UE 1), as multiple sidelink CSI reports may exist for different Tx UEs.

In some aspects, the base station may tunnel a DCI grant (e.g., a DCI 3_0 grant) for the Rx UE. For example, rather than transmitting the DCI grant for the MAC-CE CSI report directly to the Rx UE (e.g., UE 1), the base station may include the DCI grant for the sidelink CSI feedback in DCI transmitted to the Tx UE, and the DCI grant may be further included in sidelink control information (SCI) transmitted from the Tx UE to the Rx UE. In other words, rather than transmitting the DCI grant for the sidelink CSI feedback directly to the Rx UE, the base station may transmit the DCI grant to the Rx UE via the Tx UE, which may be beneficial when the Rx UE is out-of-coverage with the base station.

In some aspects, a time domain resource allocation (TDRA) and/or a frequency domain resource allocation (FDRA) for the sidelink CSI feedback may be determined prior to the base station transmitting the DCI with the sidelink CSI feedback trigger to the Tx UE. In some aspects, the DCI grant for the Rx UE may be added to an end of a DCI for the sidelink CSI feedback triggering, which may be transmitted from the base station to the Tx UE. The Tx UE may receive, from the base station, the DCI grant for the sidelink CSI feedback from the Rx UE. The Tx UE may transmit the SCI to the Rx UE, and the SCI may carry the DCI grant for the sidelink CSI feedback as part of a payload of the SCI. In some aspects, by tunneling the DCI grant to the Rx UE via the Tx UE, no additional DCI is used, which saves on control signaling overhead.

As shown by reference number 306, the Tx UE may transmit a CSI-RS to the Rx UE. The Tx UE may transmit the CSI-RS based at least in part on the DCI that triggers the CSI reporting, as received from the base station. For example, the Tx UE may transmit the CSI-RS using time/frequency resources based at least in part on the DCI received from the base station that triggers the CSI reporting.

As shown by reference number 308, the Rx UE may transmit the MAC-CE CSI report to the Tx UE. The Rx UE may transmit the MAC-CE CSI report based at least in part on the CSI-RS received from the Tx UE. Further, the Rx UE may transmit the MAC-CE CSI report based at least in part on the DCI grant for the MAC-CE CSI report, as received directly from the base station or via the Tx UE.

As indicated above, FIG. 3 is provided as an example. Other examples may differ from what is described with regard to FIG. 3.

Figure 4:
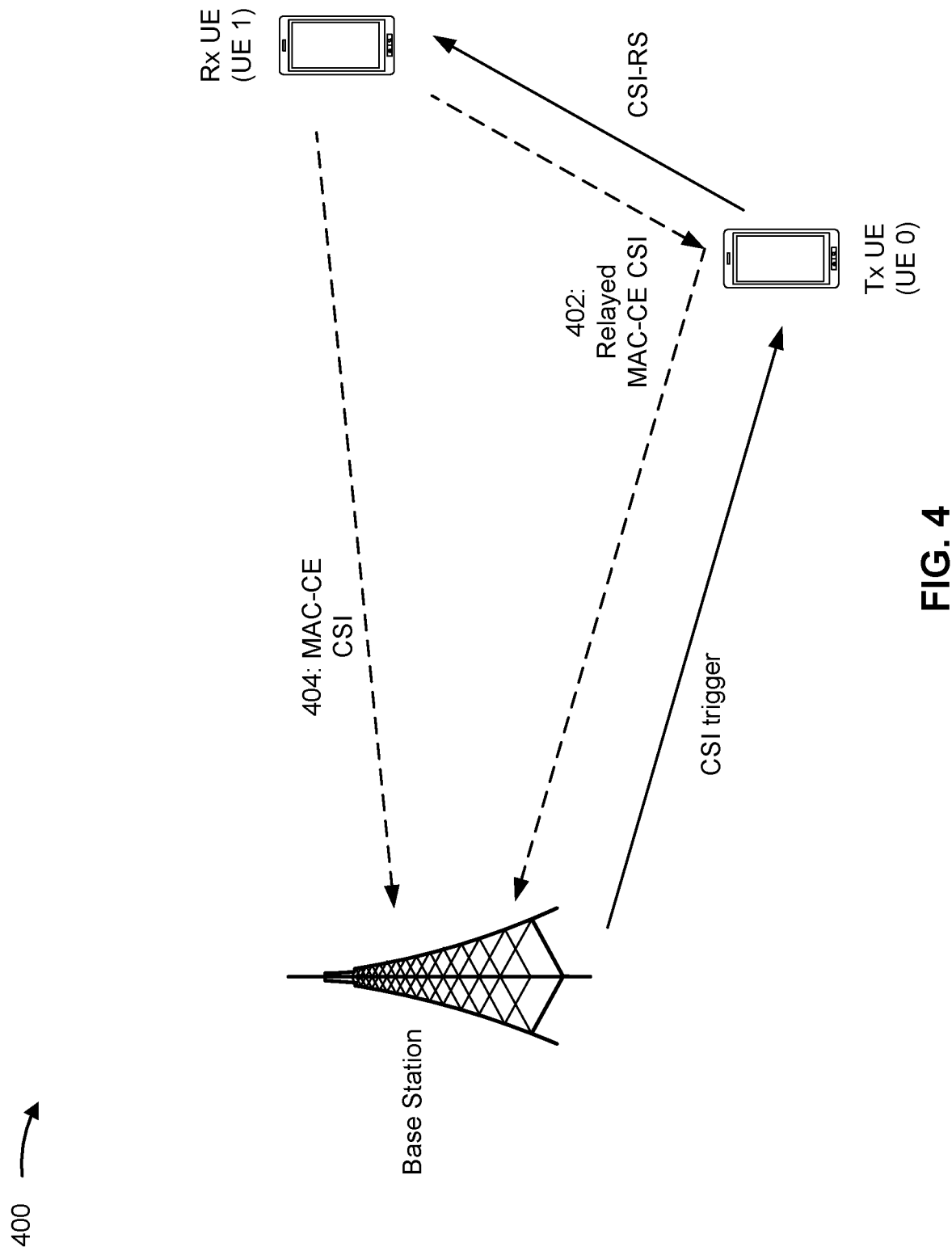

FIG. 4 is a diagram illustrating an example 400 associated with CSI reporting for sidelink UEs, in accordance with the present disclosure. As shown in FIG. 4, example 400 includes communication between a base station (e.g., base station 110), a Tx UE (e.g., UE 120a) and an Rx UE (e.g., UE 120e). In some aspects, the Tx UE (UE 0), the Rx UE (UE 1), and the base station may be included in a wireless network such as wireless network 100. The Tx UE and the Rx UE may communicate on a wireless sidelink.

In some aspects, the base station may transmit DCI (e.g., DCI 3_0), to the Tx UE, that triggers CSI reporting from the Rx UE to the Tx UE, as shown by reference number 302 in FIG. 3. The Tx UE may transmit a CSI-RS to the Rx UE based at least in part on receiving the DCI that triggers the CSI reporting, as shown by reference number 306 in FIG. 3. The Rx UE may generate a MAC-CE CSI report based at least in part on the CSI-RS received from the Tx UE, as shown by reference number 308 in FIG. 3.

As shown by reference number 402, the Tx UE may receive the MAC-CE CSI report from the Rx UE, and the Tx UE may forward or soft relay the MAC-CE CSI report to the base station. In some aspects, the Rx UE and the Tx UE may both be in coverage with respect to the base station, even though the Tx UE may relay the MAC-CE CSI report received from the Rx UE to the base station. In some aspects, the Rx UE may not support a uU link with the base station. In other words, the Rx UE may be out-of-coverage with respect to the base station, so the Tx UE may relay the MAC-CE CSI report for the Rx UE.

As shown by reference number 404, as an alternative, the Rx UE may directly transmit the MAC-CE CSI report to the base station. The Rx UE may transmit the MAC-CE CSI report via a physical uplink shared channel (PUSCH) to the base station. In some aspects, when the Rx UE directly transmits the MAC-CE CSI report to the base station, both the Rx UE and the Tx UE may be in coverage with respect to the base station.

In some aspects, the base station may benefit from receiving the MAC-CE CSI report associated with the Rx UE, either directly from the Rx UE or via the Tx UE. For example, with CSI, the base station may improve a selection of a subchannel and a number of subchannels to transmit a transport block.

As indicated above, FIG. 4 is provided as an example. Other examples may differ from what is described with regard to FIG. 4.

Figure 5:
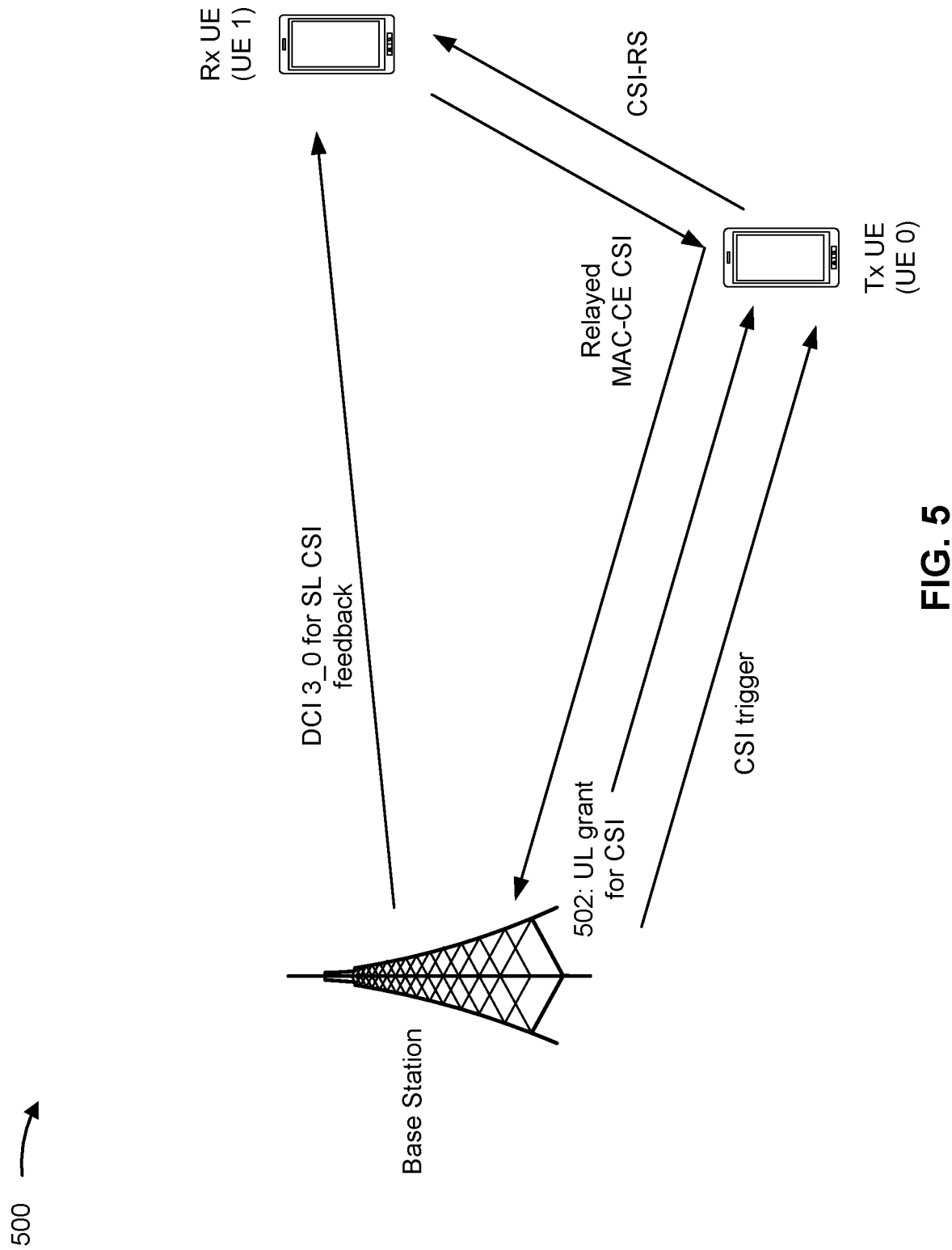

FIG. 5 is a diagram illustrating an example 500 associated with CSI reporting for sidelink UEs, in accordance with the present disclosure. As shown in FIG. 5, example 500 includes communication between a base station (e.g., base station 110), a Tx UE (e.g., UE 120a) and an Rx UE (e.g., UE 120e). In some aspects, the Tx UE (UE 0), the Rx UE (UE 1), and the base station may be included in a wireless network such as wireless network 100. The Tx UE and the Rx UE may communicate on a wireless sidelink.

In some aspects, the base station may transmit DCI (e.g., DCI 3_0), to the Tx UE, that triggers CSI reporting from the Rx UE to the Tx UE, as shown by reference number 302 in FIG. 3. The base station may transmit a DCI (e.g., DCI 3_0) grant, to the Rx UE, for sidelink CSI feedback, as shown by reference number 304. The Tx UE may transmit a CSI-RS to the Rx UE based at least in part on receiving the DCI that triggers the CSI reporting, as shown by reference number 306. The Tx UE may receive a MAC-CE CSI report from the Rx UE based at least in part on the CSI-RS, and the Tx UE may forward or soft relay the MAC-CE CSI report to the base station, as shown by reference number 402.

In some aspects, the base station may instruct the Tx UE to feed back the MAC-CE CSI report from the Rx UE. For example, the base station may configure the Tx UE, via an RRC configuration, to prepare for a relayed MAC-CE CSI report after the MAC-CE CSI report is received at the Tx UE from the Rx UE, and the Tx UE may transmit or relay the MAC-CE CSI report back to the base station.

As shown by reference number 502, the base station may transmit, to the Tx UE, an uplink grant for CSI. The uplink grant may enable the Tx UE to feedback, to the base station, the MAC-CE CSI report received from the Rx UE. The base station may have information on when a relayed MAC-CE CSI report is expected to be ready at the Tx UE, based at least in part on a sidelink CSI timeline. In other words, the uplink grant may be used for polling CSI.

In some aspects, multiple sidelink CSI reports may be associated with multiple Rx UEs, and an indication of sidelink CSI polling may be included in uplink DCI with a new code point. In some aspects, the uplink grant may also be a tunneled grant via DCI (e.g., DCI 3_0), which may be transmitted from the base station to the Tx UE. In other words, the uplink grant may be included in the DCI associated with the CSI report triggering.

In some aspects, the base station may tunnel an uplink grant for the Rx UE via the Tx UE. For example, instead of transmitting the DCI with the uplink grant for the MAC-CE CSI report directly to the Rx UE, the base station may tunnel or include the uplink grant in DCI transmitted to the Tx UE, and the uplink grant may be further included in SCI transmitted from the Tx UE to the Rx UE.

In some aspects, the Tx UE may receive the MAC-CE CSI report from the Rx UE. When the MAC-CE CSI report is ready to be relayed or transmitted to the base station, the Tx UE may initiate a scheduling request (SR) procedure to relay the MAC-CE CSI report. The Tx UE may initiate the SR procedure when no uplink grant is available to piggyback uplink data, such as the MAC-CE CSI report.

As indicated above, FIG. 5 is provided as an example. Other examples may differ from what is described with regard to FIG. 5.

In some aspects, a sidelink CSI report received at the base station may indicate an RX UE ID to identify an associated Rx UE, which may be useful when multiple sidelink CSI reports are received from the Tx UE. The base station and/or the Tx UE may request a sidelink CSI report from multiple Rx UEs at a same time.

In some aspects, the MAC-CE CSI report may indicate an Rx UE ID of an Rx UE associated with the MAC-CE CSI report. In some aspects, the Rx UE may directly include its Rx UE ID in the MAC-CE CSI report, and the Tx UE may directly relay the MAC-CE CSI report to the base station. In this case, a legacy PC5 CSI MAC-CE field from the Rx UE may be modified to include the Rx UE ID. In some aspects, when the MAC-CE CSI report is relayed by the Tx UE, the Tx UE may add the Rx UE ID to the relayed MAC-CE CSI report. In this case, a new uU MAC-CE for a sidelink CSI report from the Rx UE may be defined.

In some aspects, when the MAC-CE CSI report is relayed by the Tx UE to the base station, a sidelink CSI reporting may be associated with a longer timeline as compared to the Rx UE directly transmitting the MAC-CE CSI report to the base station. The longer timeline may be a result of the MAC-CE CSI report traveling from the Rx UE to the Tx UE via a PC5 interface, and then traveling from the Tx UE to the base station via a uU interface. Further, the base station may assign time/frequency resources via DCI for the MAC-CE CSI report to be transmitted from the Rx UE to the Tx UE, and the base station may provide an additional uU uplink grant for the MAC-CE CSI report to be transmitted from the Tx UE to the base station. In some cases, the Rx UE may be out-of-coverage when a tunneled CSI feedback grant is used to convey the MAC-CE CSI report.

Figure 6:
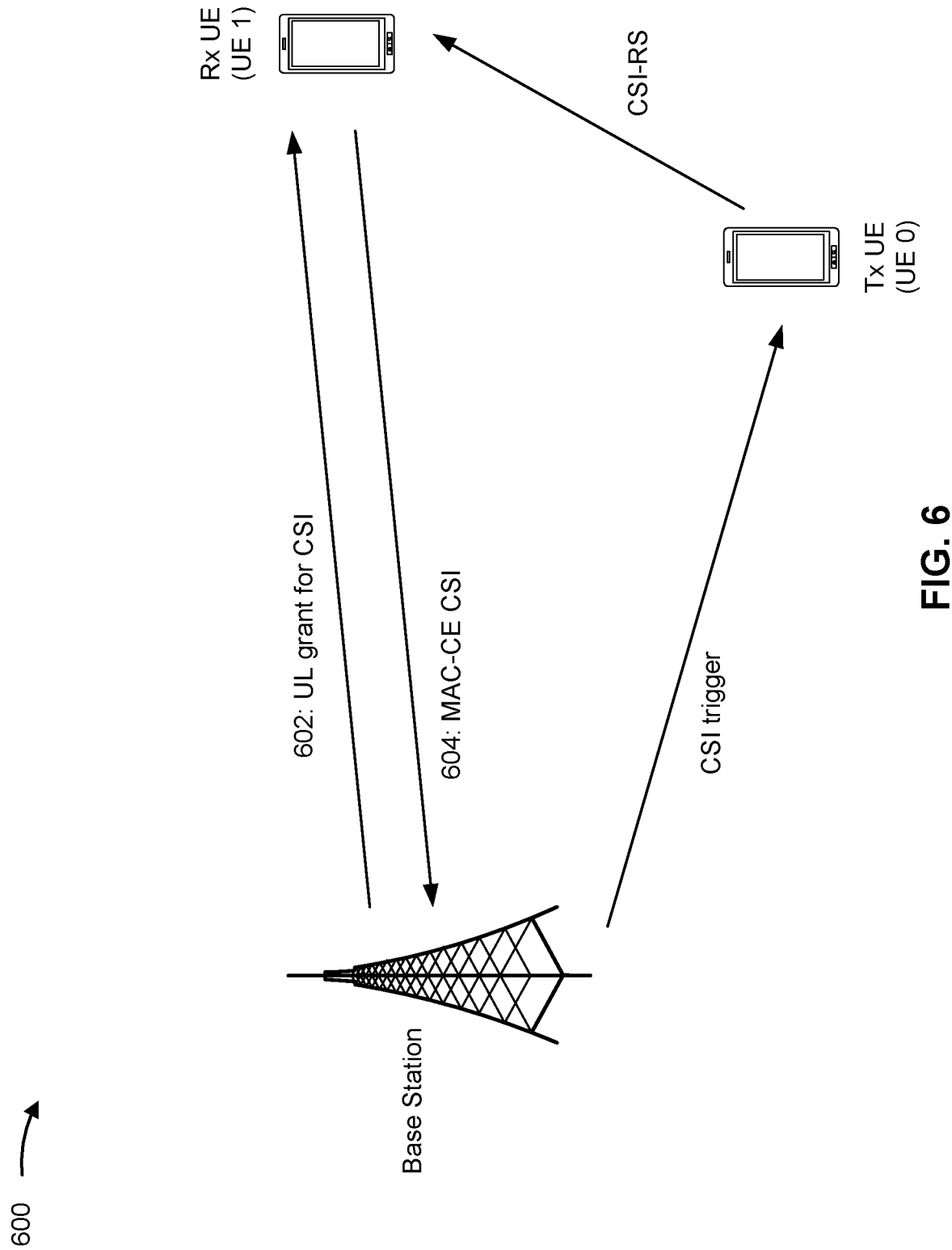

FIG. 6 is a diagram illustrating an example 600 associated with CSI reporting for sidelink UEs, in accordance with the present disclosure. As shown in FIG. 6, example 600 includes communication between a base station (e.g., base station 110), a Tx UE (e.g., UE 120a) and an Rx UE (e.g., UE 120e). In some aspects, the Tx UE (UE 0), the Rx UE (UE 1), and the base station may be included in a wireless network such as wireless network 100. The Tx UE and the Rx UE may communicate on a wireless sidelink.

In some aspects, the base station may transmit DCI (e.g., DCI 3_0), to the Tx UE, that triggers CSI reporting from the Rx UE to the Tx UE, as shown by reference number 302 in FIG. 3. The Tx UE may transmit a CSI-RS to the Rx UE based at least in part on receiving the DCI that triggers the CSI reporting, as shown by reference number 306. The Rx UE may directly transmit a MAC-CE CSI report to the base station, as shown by reference number 404 in FIG. 4.

As shown by reference number 602, the base station may transmit an uplink grant (e.g., a uU uplink grant) to the Rx UE for MAC-CE CSI reporting from the Rx UE to the base station. The base station, by transmitting the uplink grant, may instruct the Rx UE to directly send the MAC-CE CSI report to the base station via a uU interface between the base station and the Rx UE. In other words, the base station may instruct the Rx UE to feedback sidelink CSI via a MAC-CE directly to the base station.

In some aspects, a new codepoint may be included in DCI (e.g., DCI 3_0) transmitted by the base station to the Rx UE, and/or SCI communicated between the Rx UE and the Tx UE. The new codepoint may instruct the Rx UE to transmit the MAC-CE CSI report to the Tx UE, or to the Tx UE and directly to the base station via the uplink grant. In some aspects, the new codepoint may be configured via RRC signaling, instead of being included in the DCI and the SCI.

As shown by reference number 604, the Rx UE may transmit the MAC-CE CSI report to the base station. In some aspects, the Rx UE may transmit the MAC-CE based at least in part on the uplink grant received from the base station. In some aspects, the Rx UE may transmit the MAC-CE based at least in part on the new codepoint included in the DCI and/or the SCI.

In some aspects, the base station may poll MAC-CE CSI from the Rx UE with the uplink grant. The base station may have information on when the MAC-CE CSI report is expected to be ready at the Rx UE, based at least in part on a sidelink CSI timeline. The base station may transmit the uplink grant to enable the Rx UE to feedback the MAC-CE CSI report to the base station.

In some aspects, multiple sidelink CSI reports may be associated with multiple Tx UEs, and an indication of sidelink CSI polling may be included in uplink DCI with a new code point. In some aspects, the uplink grant may also be a tunneled grant for the Rx UE. For example, instead of transmitting DCI with the uplink grant for MAC-CE CSI reporting directly to the Rx UE, the base station may tunnel or include the uplink grant in DCI transmitted to the Tx UE, and the uplink grant may further be included in SCI transmitted from the Tx UE to the Rx UE.

In some aspects, when the MAC-CE CSI report is ready to be transmitted to the base station, the Rx UE may initiate an SR procedure to transmit the MAC-CE CSI report. The Rx UE may initiate the SR procedure when no uplink grant is available to piggyback uplink data, such as the MAC-CE CSI report.

As indicated above, FIG. 6 is provided as an example. Other examples may differ from what is described with regard to FIG. 6.

In some aspects, the Tx UE may transmit, to the Rx UE, an indication of a cell ID associated with the Tx UE, as the Rx UE may not camp on a same cell as the Tx UE with a uU interface with a base station. The Rx UE may determine the cell ID associated with the Tx UE for validation purposes. In some aspects, the Tx UE may transmit the indication via SCI or L2 signaling. In other words, the Tx UE may signal, to the Rx UE, the cell ID associated with the Tx UE via SCI or L2 signaling.

In some aspects, the Rx UE may indicate a Tx UE ID in the MAC-CE CSI report transmitted to the base station. In some cases, even in a same cell, multiple Tx UEs may be performing sidelink communications with an Rx UE. Different Tx UE and Rx UE pairs may be associated with different CSI, and the base station may determine that a MAC-CE CSI report is associated with a particular Tx UE and Rx UE pair based at least in part on a Tx UE and Rx UE ID field of the MAC-CE CSI report. In some aspects, when multiple Tx UEs are in the same cell, the base station may determine which Tx UE is to relay application traffic to an Rx UE based at least in part on MAC-CE CSI report(s) received from Rx UE(s).

Figure 7:
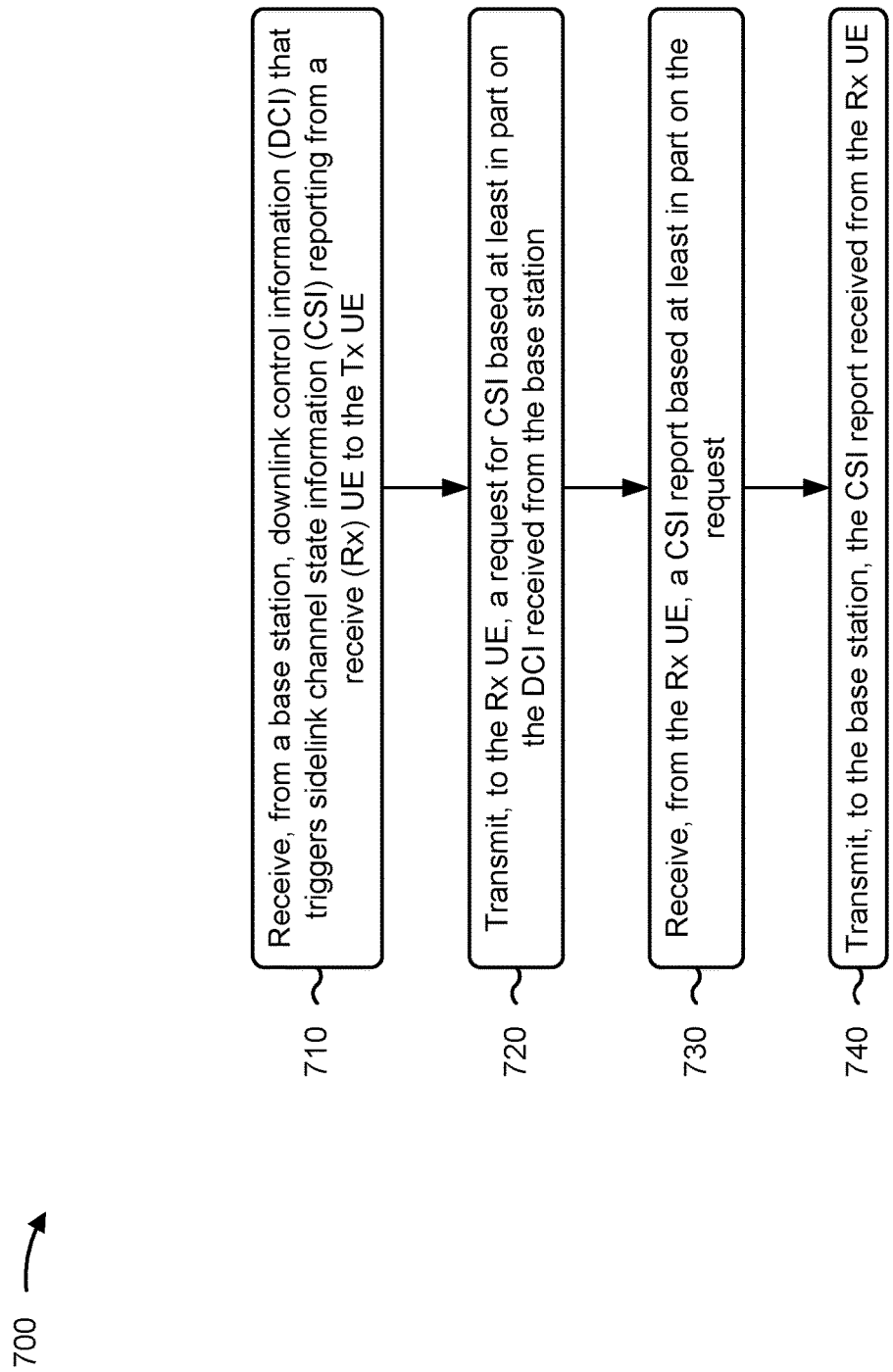
FIGS. 7-8 are diagrams illustrating example processes associated with CSI reporting for sidelink UEs, in accordance with the present disclosure.

FIG. 7 is a diagram illustrating an example process 700 performed, for example, by a Tx UE, in accordance with the present disclosure. Example process 700 is an example where the Tx UE (e.g., UE 120a) performs operations associated with sidelink CSI reporting.

As shown in FIG. 7, in some aspects, process 700 may include receiving, from a base station, DCI that triggers sidelink CSI reporting from an Rx UE to the Tx UE (block 710). For example, the Tx UE (e.g., using reception component 902, depicted in FIG. 9) may receive, from a base station, DCI that triggers sidelink CSI reporting from an Rx UE to the Tx UE, as described above.

As further shown in FIG. 7, in some aspects, process 700 may include transmitting, to the Rx UE, a request for CSI based at least in part on the DCI received from the base station (block 720). For example, the Tx UE (e.g., using transmission component 904, depicted in FIG. 9) may transmit, to the Rx UE, a request for CSI based at least in part on the DCI received from the base station, as described above.

As further shown in FIG. 7, in some aspects, process 700 may include receiving, from the Rx UE, a CSI report based at least in part on the request (block 730). For example, the Tx UE (e.g., using reception component 902, depicted in FIG. 9) may receive, from the Rx UE, a CSI report based at least in part on the request, as described above.

As further shown in FIG. 7, in some aspects, process 700 may include transmitting, to the base station, the CSI report received from the Rx UE (block 740). For example, the Tx UE (e.g., using transmission component 904, depicted in FIG. 9) may transmit, to the base station, the CSI report received from the Rx UE, as described above.

Process 700 may include additional aspects, such as any single aspect or any combination of aspects described below and/or in connection with one or more other processes described elsewhere herein.

In a first aspect, the DCI is a first DCI, and receiving the CSI report comprises receiving the CSI report from the Rx UE based at least in part on a second DCI transmitted from the base station to the Rx UE that indicates a sidelink grant for the Rx UE to transmit the CSI report to the Tx UE.

In a second aspect, alone or in combination with the first aspect, receiving the DCI comprises receiving the DCI that indicates a sidelink grant for the Rx UE to transmit the CSI report to the Tx UE, and process 700 includes transmitting sidelink information to the Rx UE that includes the sidelink grant.

In a third aspect, alone or in combination with one or more of the first and second aspects, transmitting the CSI report comprises transmitting the CSI report to the base station based at least in part on an uplink grant received from the base station.

In a fourth aspect, alone or in combination with one or more of the first through third aspects, receiving the DCI comprises receiving the DCI that indicates an uplink grant for transmitting the CSI report to the base station.

In a fifth aspect, alone or in combination with one or more of the first through fourth aspects, transmitting the CSI report comprises transmitting the CSI report to the base station based at least in part on a scheduling request procedure.

In a sixth aspect, alone or in combination with one or more of the first through fifth aspects, the CSI report received from the Rx UE indicates an Rx UE identifier associated with the Rx UE.

In a seventh aspect, alone or in combination with one or more of the first through sixth aspects, process 700 includes adding an Rx UE identifier associated with the Rx UE to the CSI report transmitted to the base station.

In an eighth aspect, alone or in combination with one or more of the first through seventh aspects, process 700 includes transmitting, to the Rx UE, an indication of a Tx UE identifier associated with the Tx UE.

In a ninth aspect, alone or in combination with one or more of the first through eighth aspects, the DCI is a DCI 3_0, the CSI report is a medium access control control element (MAC-CE) CSI report, and the request for CSI is associated with a channel state information reference signal (CSI-RS).

In a tenth aspect, alone or in combination with one or more of the first through ninth aspects, the Tx UE is in coverage with the base station and the Rx UE is in coverage with the base station.

In an eleventh aspect, alone or in combination with one or more of the first through tenth aspects, the Tx UE is in coverage with the base station and the Rx UE is out-of-coverage with the base station.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
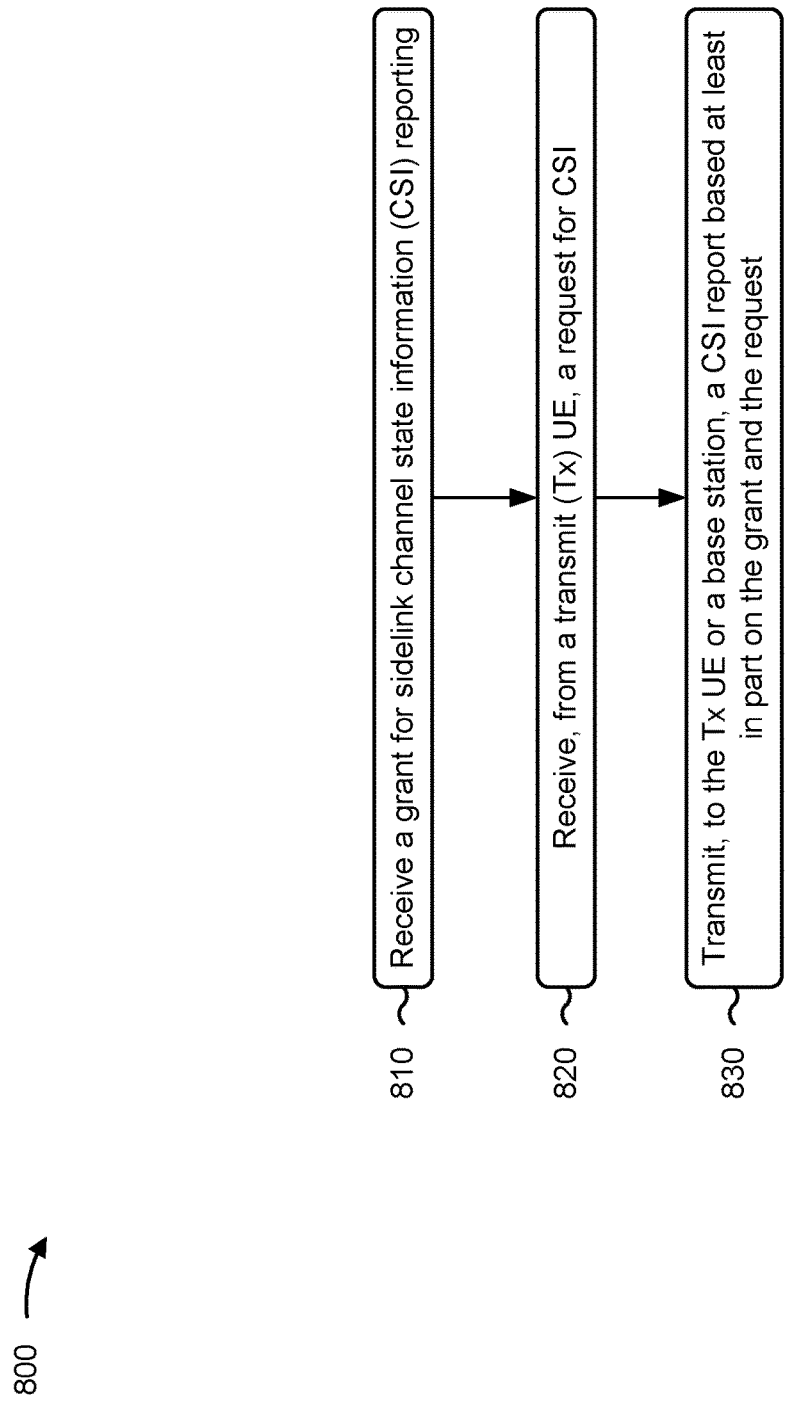

FIG. 8 is a diagram illustrating an example process 800 performed, for example, by an Rx UE, in accordance with the present disclosure. Example process 800 is an example where the Rx UE (e.g., UE 120e) performs operations associated with sidelink CSI reporting.

As shown in FIG. 8, in some aspects, process 800 may include receiving a grant for sidelink CSI reporting (block 810). For example, the Rx UE (e.g., using reception component 1002, depicted in FIG. 10) may receive a grant for sidelink CSI reporting, as described above.

As further shown in FIG. 8, in some aspects, process 800 may include receiving, from a Tx UE, a request for CSI (block 820). For example, the Rx UE (e.g., using reception component 1002, depicted in FIG. 10) may receive, from a Tx UE, a request for CSI, as described above.

As further shown in FIG. 8, in some aspects, process 800 may include transmitting, to the Tx UE or a base station, a CSI report based at least in part on the grant and the request (block 830). For example, the Rx UE (e.g., using transmission component 1004, depicted in FIG. 10) may transmit, to the Tx UE or a base station, a CSI report based at least in part on the grant and the request, as described above.

Process 800 may include additional aspects, such as any single aspect or any combination of aspects described below and/or in connection with one or more other processes described elsewhere herein.

In a first aspect, process 800 includes receiving the grant comprises receiving a sidelink grant in DCI from the base station, and transmitting the CSI report comprises transmitting the CSI report to the Tx UE based at least in part on the sidelink grant.

In a second aspect, alone or in combination with the first aspect, process 800 includes receiving the grant comprises receiving a sidelink grant in sidelink control information from the Tx UE, and transmitting the CSI report comprises transmitting the CSI report to the Tx UE based at least in part on the sidelink grant.

In a third aspect, alone or in combination with one or more of the first and second aspects, process 800 includes receiving, from the base station, DCI that includes an indication to transmit the CSI report to one or more of the Tx UE or the base station.

In a fourth aspect, alone or in combination with one or more of the first through third aspects, process 800 includes receiving, from the Tx UE, sidelink control information that includes an indication to transmit the CSI report to one or more of the Tx UE or the base station.

In a fifth aspect, alone or in combination with one or more of the first through fourth aspects, process 800 includes receiving, from the Tx UE, radio resource control signaling that includes an indication to transmit the CSI report to one or more of the Tx UE or the base station.

In a sixth aspect, alone or in combination with one or more of the first through fifth aspects, receiving the grant comprises receiving an uplink grant in DCI from the base station, and transmitting the CSI report comprises transmitting the CSI report to the base station based at least in part on the uplink grant.

In a seventh aspect, alone or in combination with one or more of the first through sixth aspects, receiving the grant comprises receiving an uplink grant in sidelink control information from the Tx UE, and transmitting the CSI report comprises transmitting the CSI report to the base station based at least in part on the uplink grant.

In an eighth aspect, alone or in combination with one or more of the first through seventh aspects, transmitting the CSI report comprises transmitting the CSI report to the base station based at least in part on a scheduling request procedure.

In a ninth aspect, alone or in combination with one or more of the first through eighth aspects, process 800 includes adding a Tx UE identifier associated with the Tx UE to the CSI report that is transmitted to the base station.

In a tenth aspect, alone or in combination with one or more of the first through ninth aspects, the Rx UE is in coverage with the base station and the Tx UE is in coverage with the base station.

In an eleventh aspect, alone or in combination with one or more of the first through tenth aspects, the Rx UE is out-of-coverage with the base station and the Tx UE is in coverage with the base station.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
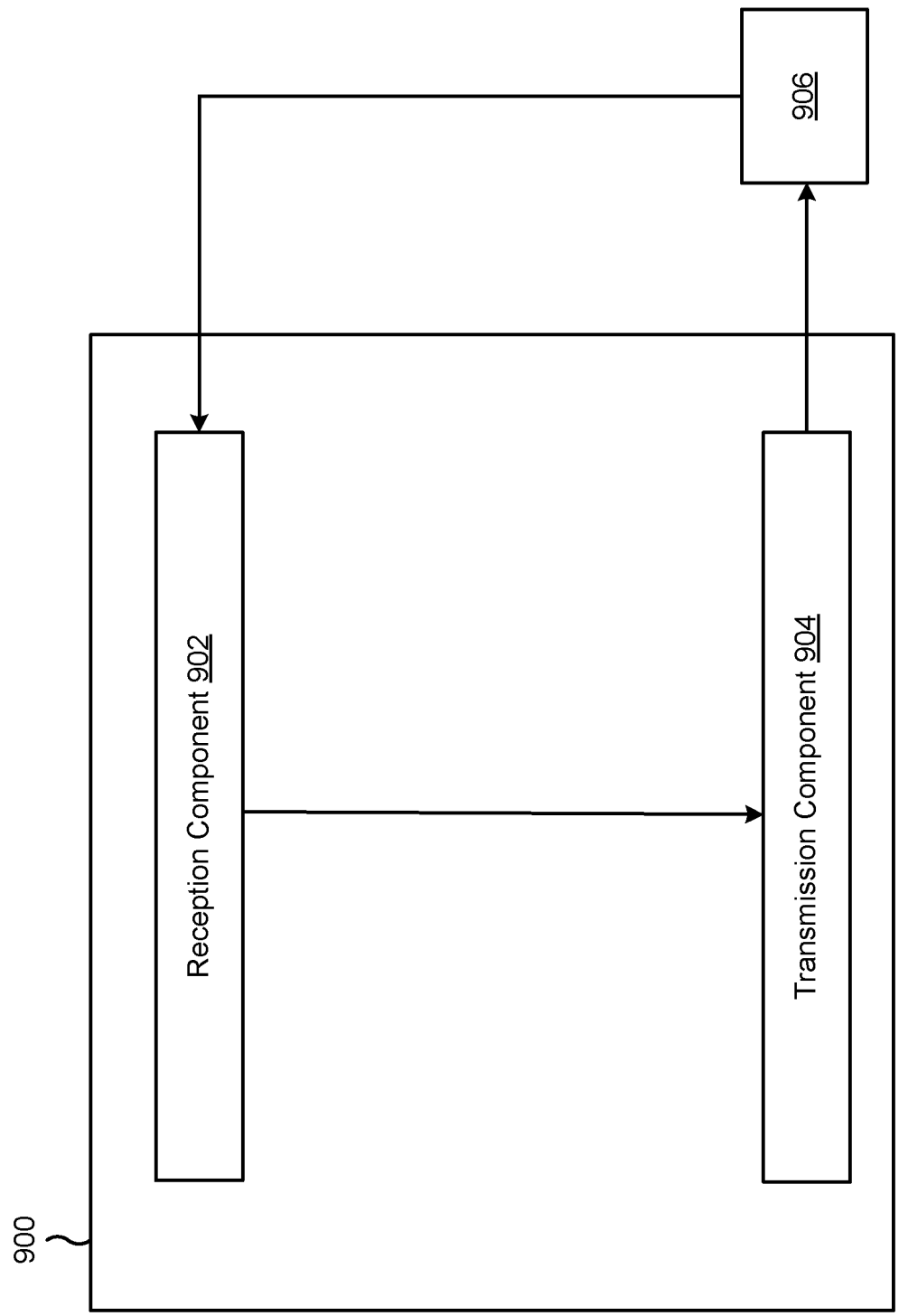
FIG. 9 is a block diagram of an example apparatus for wireless communication, in accordance with the present disclosure.

FIG. 9 is a block diagram of an example apparatus 900 for wireless communication. The apparatus 900 may be a Tx UE, or a Tx UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 3-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the Tx UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the Tx UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the Tx UE described above in connection with FIG. 2. In some aspects, the transmission component 904 may be co-located with the reception component 902 in a transceiver.

The reception component 902 may receive, from a base station, DCI that triggers sidelink CSI reporting from an Rx UE to the Tx UE. The transmission component 904 may transmit, to the Rx UE, a request for CSI based at least in part on the DCI received from the base station. The reception component 902 may receive, from the Rx UE, a CSI report based at least in part on the request. The transmission component 904 may transmit, to the base station, the CSI report received from the Rx UE.

The transmission component 904 may transmit, to the Rx UE, an indication of a Tx UE identifier associated with the Tx UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
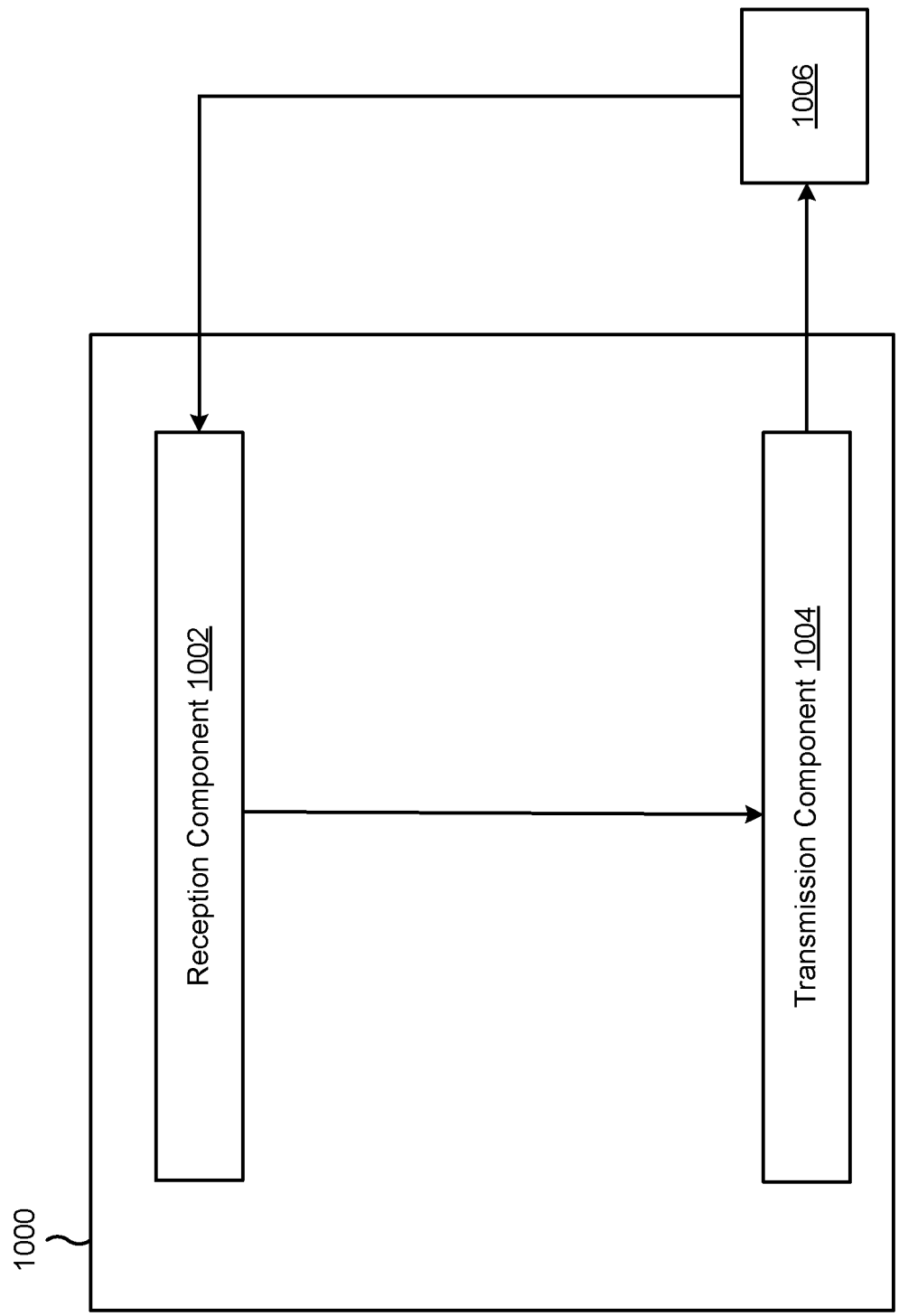
FIG. 10 is a block diagram of an example apparatus for wireless communication, in accordance with the present disclosure.

FIG. 10 is a block diagram of an example apparatus 1000 for wireless communication. The apparatus 1000 may be an Rx UE, or an Rx UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 3-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the Rx UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the Rx UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the Rx UE described above in connection with FIG. 2. In some aspects, the transmission component 1004 may be co-located with the reception component 1002 in a transceiver.

The reception component 1002 may receive a grant for sidelink CSI reporting. The reception component 1002 may receive, from a Tx UE, a request for CSI. The transmission component 1004 may transmit, to the Tx UE or a base station, a CSI report based at least in part on the grant and the request.

The reception component 1002 may receive a sidelink grant in DCI from the base station.

The transmission component 1004 may transmit the CSI report to the Tx UE based at least in part on the sidelink grant.

The reception component 1002 may receive a sidelink grant in sidelink control information from the Tx UE.

The transmission component 1004 may transmit the CSI report to the Tx UE based at least in part on the sidelink grant.

The reception component 1002 may receive, from the base station, DCI that includes an indication to transmit the CSI report to one or more of the Tx UE or the base station.

The reception component 1002 may receive, from the Tx UE, sidelink control information that includes an indication to transmit the CSI report to one or more of the Tx UE or the base station.

The reception component 1002 may receive, from the Tx UE, radio resource control signaling that includes an indication to transmit the CSI report to one or more of the Tx UE or the base station.

The reception component 1002 may receive an uplink grant in DCI from the base station.

The transmission component 1004 may transmit the CSI report to the base station based at least in part on the uplink grant.

The reception component 1002 may receive an uplink grant in sidelink control information from the Tx UE.

The transmission component 1004 may transmit the CSI report to the base station based at least in part on the uplink grant.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method of wireless communication performed by a transmit (Tx) user equipment (UE), comprising: receiving, from a base station, downlink control information (DCI) that triggers sidelink channel state information (CSI) reporting from a receive (Rx) UE to the Tx UE; transmitting, to the Rx UE, a request for CSI based at least in part on the DCI received from the base station; receiving, from the Rx UE, a CSI report based at least in part on the request; and transmitting, to the base station, the CSI report received from the Rx UE.

Aspect 2: The method of aspect 1, wherein the DCI is a first DCI, and wherein receiving the CSI report comprises receiving the CSI report from the Rx UE based at least in part on a second DCI transmitted from the base station to the Rx UE that indicates a sidelink grant for the Rx UE to transmit the CSI report to the Tx UE.

Aspect 3: The method of any of aspects 1 through 2, wherein receiving the DCI comprises receiving the DCI that indicates a sidelink grant for the Rx UE to transmit the CSI report to the Tx UE, and further comprising transmitting sidelink information to the Rx UE that includes the sidelink grant.

Aspect 4: The method of any of aspects 1 through 3, wherein transmitting the CSI report comprises transmitting the CSI report to the base station based at least in part on an uplink grant received from the base station.

Aspect 5: The method of any of aspects 1 through 4, wherein receiving the DCI comprises receiving the DCI that indicates an uplink grant for transmitting the CSI report to the base station.

Aspect 6: The method of any of aspects 1 through 5, wherein transmitting the CSI report comprises transmitting the CSI report to the base station based at least in part on a scheduling request procedure.

Aspect 7: The method of any of aspects 1 through 6, wherein the CSI report received from the Rx UE indicates an Rx UE identifier associated with the Rx UE.

Aspect 8: The method of any of aspects 1 through 7, further comprising: adding an Rx UE identifier associated with the Rx UE to the CSI report transmitted to the base station.

Aspect 9: The method of any of aspects 1 through 8, further comprising: transmitting, to the Rx UE, an indication of a Tx UE identifier associated with the Tx UE.

Aspect 10: The method of any of aspects 1 through 9, wherein the DCI is a DCI 3_0, the CSI report is a medium access control control element (MAC-CE) CSI report, and the request for CSI is associated with a channel state information reference signal (CSI-RS).

Aspect 11: The method of any of aspects 1 through 10, wherein the Tx UE is in coverage with the base station and the Rx UE is in coverage with the base station.

Aspect 12: The method of any of aspects 1 through 11, wherein the Tx UE is in coverage with the base station and the Rx UE is out-of-coverage with the base station.

Aspect 13: A method of wireless communication performed by a receive (Rx) user equipment (UE), comprising: receiving a grant for sidelink channel state information (CSI) reporting; receiving, from a transmit (Tx) UE, a request for CSI; and transmitting, to the Tx UE or a base station, a CSI report based at least in part on the grant and the request.

Aspect 14: The method of aspect 13, wherein: receiving the grant comprises receiving a sidelink grant in downlink control information (DCI) from the base station; and transmitting the CSI report comprises transmitting the CSI report to the Tx UE based at least in part on the sidelink grant.

Aspect 15: The method of any of aspects 13 through 14, wherein: receiving the grant comprises receiving a sidelink grant in sidelink control information from the Tx UE; and transmitting the CSI report comprises transmitting the CSI report to the Tx UE based at least in part on the sidelink grant.

Aspect 16: The method of any of aspects 13 through 15, further comprising: receiving, from the base station, downlink control information (DCI) that includes an indication to transmit the CSI report to one or more of the Tx UE or the base station.

Aspect 17: The method of any of aspects 13 through 16, further comprising: receiving, from the Tx UE, sidelink control information that includes an indication to transmit the CSI report to one or more of the Tx UE or the base station.

Aspect 18: The method of any of aspects 13 through 17, further comprising: receiving, from the Tx UE, radio resource control signaling that includes an indication to transmit the CSI report to one or more of the Tx UE or the base station.

Aspect 19: The method of any of aspects 13 through 18, wherein: receiving the grant comprises receiving an uplink grant in downlink control information (DCI) from the base station; and transmitting the CSI report comprises transmitting the CSI report to the base station based at least in part on the uplink grant.

Aspect 20: The method of any of aspects 13 through 19, wherein: receiving the grant comprises receiving an uplink grant in sidelink control information from the Tx UE; and transmitting the CSI report comprises transmitting the CSI report to the base station based at least in part on the uplink grant.

Aspect 21: The method of any of aspects 13 through 20, wherein transmitting the CSI report comprises transmitting the CSI report to the base station based at least in part on a scheduling request procedure.

Aspect 22: The method of any of aspects 13 through 21, further comprising: adding a Tx UE identifier associated with the Tx UE to the CSI report that is transmitted to the base station.

Aspect 23: The method of any of aspects 13 through 22, wherein the Rx UE is in coverage with the base station and the Tx UE is in coverage with the base station.

Aspect 24: The method of any of aspects 13 through 23, wherein the Rx UE is out-of-coverage with the base station and the Tx UE is in coverage with the base station.

Aspect 25: An apparatus for wireless communication at a device, comprising a processor; memory coupled with the processor; and instructions stored in the memory and executable by the processor to cause the apparatus to perform the method of one or more aspects of aspects 1-12.

Aspect 26: A device for wireless communication, comprising a memory and one or more processors coupled to the memory, the memory and the one or more processors configured to perform the method of one or more aspects of aspects 1-12.

Aspect 27: An apparatus for wireless communication, comprising at least one means for performing the method of one or more aspects of aspects 1-12.

Aspect 28: A non-transitory computer-readable medium storing code for wireless communication, the code comprising instructions executable by a processor to perform the method of one or more aspects of aspects 1-12.

Aspect 29: A non-transitory computer-readable medium storing a set of instructions for wireless communication, the set of instructions comprising one or more instructions that, when executed by one or more processors of a device, cause the device to perform the method of one or more aspects of aspects 1-12.

Aspect 30: An apparatus for wireless communication at a device, comprising a processor; memory coupled with the processor; and instructions stored in the memory and executable by the processor to cause the apparatus to perform the method of one or more aspects of aspects 13-24.

Aspect 31: A device for wireless communication, comprising a memory and one or more processors coupled to the memory, the memory and the one or more processors configured to perform the method of one or more aspects of aspects 13-24.

Aspect 32: An apparatus for wireless communication, comprising at least one means for performing the method of one or more aspects of aspects 13-24.

Aspect 33: A non-transitory computer-readable medium storing code for wireless communication, the code comprising instructions executable by a processor to perform the method of one or more aspects of aspects 13-24.

Aspect 34: A non-transitory computer-readable medium storing a set of instructions for wireless communication, the set of instructions comprising one or more instructions that, when executed by one or more processors of a device, cause the device to perform the method of one or more aspects of aspects 13-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmit (Tx) user equipment (UE), comprising:
receiving, in a first downlink control information (DCI) 3_0 and from a network node, an uplink grant associated with enabling reporting of a particular channel state information (CSI) report, associated with a receive (Rx) UE, to the network node,
wherein the uplink grant indicates a destination identifier, associated with the Tx UE, indicating the particular CSI report;
transmitting, to the Rx UE and based at least in part on the first DCI 3_0, a request, for the particular CSI report, indicating the destination identifier;
receiving, from the Rx UE and based at least in part on transmitting the request, the particular CSI report;
adding, based at least in part on receiving the particular CSI report, a receiver identifier, identifying the Rx UE, to the particular CSI report; and
transmitting, to the network node and based on adding the receiver identifier to the particular CSI report, the particular CSI report,
wherein the particular CSI report is transmitted to the network node via a scheduling request procedure based at least in part on whether any uplink grant is available for the Tx UE to transmit the particular CSI report to the network node.

2. The method of claim 1, wherein the first DCI 3_0 includes a sidelink grant for the Rx UE to transmit the particular CSI report to the Tx UE, and wherein the request comprises sidelink information that includes the sidelink grant.

3. The method of claim 1, wherein the particular CSI report is transmitted to the network node independent of the scheduling request procedure based at least in part on receiving the uplink grant.

4. The method of claim 1, wherein the first DCI 3_0 indicates the uplink grant.

5. The method of claim 1, further comprising:
transmitting, to the Rx UE, an indication of the destination identifier associated with the Tx UE,
wherein the particular CSI report is received from the Rx UE further based at least in part on transmitting the indication.

6. The method of claim 1, wherein the particular CSI report is a medium access control control element (MAC-CE) CSI report.

7. The method of claim 1, wherein the Tx UE is in coverage with the network node and the Rx UE is in coverage with the network node.

8. The method of claim 1, wherein the Tx UE is in coverage with the network node and the Rx UE is out-of-coverage with the network node.

9. The method of claim 1, wherein the request is transmitted to the Rx UE using time/frequency resources that are based at least in part on the first DCI 3_0.

10. The method of claim 1, wherein receiving the CSI report is further based at least in part on a second DCI indicating a sidelink grant for the RX UE to transmit the particular CSI report to the Tx UE.

11. The method of claim 1, wherein the request for the particular CSI report is associated with a channel state information reference signal (CSI-RS).

12. The method of claim 1, further comprising:
transmitting an indication of a cell identifier associated with the Tx UE,
wherein the particular CSI report is further received based at least in part on the cell identifier.

13. The method of claim 12, wherein the indication of the cell identifier is transmitted via sidelink control information or L2 signaling.

14. A method of wireless communication performed by a receive (Rx) user equipment (UE), comprising:
receiving, in a first downlink control information (DCI) 3_0 and from a network node, an uplink grant associated with enabling reporting of a particular channel state information (CSI) report, associated with a transmit (Tx) UE, directly to the network node via the uplink grant;
receiving, in a second DCI 3_0 and from the Tx UE, sidelink control information (SCI) comprising the uplink grant for the particular CSI report to be transmitted to the TX UE via the uplink grant in a payload of the SCI;
identifying, based at least in part on a destination identifier included in the uplink grant of at least one of the first DCI 3_0 or the second DCI 3_0, the particular CSI report of a plurality of CSI reports, associated with a plurality of Tx UEs including the Tx UE, stored at the Rx UE; and
transmitting, directly to the network node and based at least in part on receiving the uplink grant and the SCI and identifying the particular CSI report, the particular CSI report, wherein the particular CSI report is transmitted directly to the network node via a scheduling request procedure based at least in part on whether any uplink grant is available for the Rx UE to transmit the particular CSI report to the network node.

15. The method of claim 14, wherein at least one of the first DCI 3_0 or the second DCI 3_0 further includes a sidelink grant for the Rx UE to transmit the particular CSI to the Tx UE, and the method further comprising:
transmitting, directly to the Tx UE and based at least in part on identifying the particular CSI report, the particular CSI report.

16. The method of claim 14, further comprising:
adding, based at least in part on identifying the particular CSI report, the destination identifier to the particular CSI report,
wherein the particular CSI report transmitted to the Tx UE based at least in part on adding the destination identifier to the particular CSI report.

17. The method of claim 14, wherein the Rx UE is in coverage with the network node and the Tx UE is in coverage with the network node.

18. The method of claim 14, wherein the Rx UE is out-of-coverage with the network node and the Tx UE is in coverage with the network node.

19. The method of claim 14, wherein the particular CSI report is a medium access control control element (MAC-CE) CSI report.

20. A transmit (Tx) user equipment (UE) for wireless communication, comprising:
one or more memories; and
one or more processors coupled to the one or more memories, the one or more processors configured to:
receive, in a first downlink control information (DCI) 3_0 from a network node, an uplink grant associated with enabling reporting of a particular channel state information (CSI) report, associated with a receive (Rx) UE, to the network node,
wherein the uplink grant indicates a destination identifier, associated with the Tx UE, indicating the particular CSI report;
transmit, to the Rx UE and based at least in part on the first DCI 3_0, a request, for the particular CSI report, indicating the destination identifier;
receive, from the Rx UE and based at least in part on transmitting the request, the particular CSI report;
add, based at least in part on receiving the particular CSI report, a receiver identifier, identifying the Rx UE, to the particular CSI report; and
transmit, to the network node and based on adding the receiver identifier to the particular CSI report, the particular CSI report,
wherein the particular CSI report is transmitted to the network node via a scheduling request procedure based at least in part on whether any uplink grant is available for the Tx UE to transmit the particular CSI report to the network node.

21. The Tx UE of claim 20, wherein the first DCI 3_0 includes a sidelink grant for the Rx UE to transmit the particular CSI report to the Tx UE, and wherein the request comprises sidelink information that includes the sidelink grant.

22. The Tx UE of claim 20, wherein the request is transmitted to the Rx UE using time/frequency resources that are based at least in part on the first DCI 3_0.

23. The Tx UE of claim 20, wherein the CSI report is received further based at least in part on a second DCI indicating a sidelink grant for the RX UE to transmit the particular CSI report to the Tx UE.

24. The Tx UE of claim 20, wherein the request for the particular CSI report is associated with a channel state information reference signal (CSI-RS).

25. The Tx UE of claim 20, wherein the one or more processors are further configured to:
transmit an indication of a cell identifier associated with the Tx UE,
wherein the particular CSI report is further received based at least in part on the cell identifier.

26. The Tx UE of claim 25, wherein the indication of the cell identifier is transmitted via sidelink control information or L2 signaling.

27. A receive (Rx) user equipment (UE) for wireless communication, comprising:
one or more memories; and
one or more processors coupled to the one or more memories, the one or more processors configured to:
receive, in a first downlink control information (DCI) 3_0 and from a network node, an uplink grant associated with enabling reporting of a particular channel state information (CSI) report, associated with a transmit (Tx) UE, directly to the network node via the uplink grant;
receive, in a second DCI 3_0 and from the Tx UE, sidelink control information (SCI) comprising the uplink grant for the particular CSI report to be transmitted to the TX UE via the uplink grant in a payload of the SCI;
identify, based at least in part on a destination identifier included in the uplink grant of at least one of the first DCI 3_0 or the second DCI 3_0, the particular CSI report of a plurality of CSI reports, associated with a plurality of Tx UEs including the Tx UE, stored at the Rx UE; and
transmit, directly to the network node and based at least in part on receiving the uplink grant and the SCI and identifying the particular CSI report, the particular CSI report,
wherein the particular CSI report is transmitted directly to the network node via a scheduling request procedure based at least in part on whether any uplink grant is available for the Rx UE to transmit the particular CSI report to the network node.

28. The Rx UE of claim 27, wherein the one or more processors are further configured to:
add, based at least in part on identifying the particular CSI report, the destination identifier to the particular CSI report,
wherein the particular CSI report transmitted to the Tx UE based at least in part on adding the destination identifier to the particular CSI report.

29. The Rx UE of claim 27, wherein the one or more processors are further configured to:
receive an indication of a cell identifier associated with the Tx UE,
wherein the particular CSI report is further identified based at least in part on the cell identifier.

30. The Rx UE of claim 29, wherein the indication of the cell identifier is received via sidelink control information or L2 signaling.

* * * * *